(12) United States Patent
Papendieck et al.

(10) Patent No.: US 8,177,181 B2
(45) Date of Patent: May 15, 2012

(54) CARRYING ARRANGEMENT

(75) Inventors: Stefan Papendieck, Sereetz (DE); Gunnar Wiegandt, Herrnburg (DE)

(73) Assignee: Draeger Medical AG & Co. KG, Luebeck (DE)

( * ) Notice: Subject to any disclaimer, the term of this patent is extended or adjusted under 35 U.S.C. 154(b) by 727 days.

(21) Appl. No.: 11/723,984

(22) Filed: Mar. 23, 2007

(65) Prior Publication Data

US 2007/0228230 A1 Oct. 4, 2007

(30) Foreign Application Priority Data

Mar. 28, 2006 (DE) .......................... 10 2006 014 217

(51) Int. Cl.
*A47F 5/00* (2006.01)

(52) U.S. Cl. ......... 248/281.11; 248/284.11; 248/280.11; 248/585

(58) Field of Classification Search ............. 248/291.11, 248/585, 592, 564, 284.1, 325, 292.11, 584, 248/591, 631
See application file for complete search history.

(56) References Cited

U.S. PATENT DOCUMENTS

| | | | | |
|---|---|---|---|---|
| 4,844,387 A | * | 7/1989 | Sorgi et al. | 108/5 |
| 5,108,063 A | * | 4/1992 | Koerber et al. | 248/284.1 |
| 5,799,917 A | * | 9/1998 | Li | 248/284.1 |
| 6,012,693 A | * | 1/2000 | Voeller et al. | 248/280.11 |
| 7,059,574 B2 | * | 6/2006 | Oddsen, Jr. | 248/280.11 |
| 7,097,145 B2 | * | 8/2006 | Turner | 248/281.11 |

FOREIGN PATENT DOCUMENTS

| | | | |
|---|---|---|---|
| DE | 3642945 A1 | * | 6/1988 |
| DE | 43 18 659 | | 12/1994 |
| DE | 195 01 028 A1 | | 7/1996 |
| DE | 195 26 632 | | 1/1997 |
| DE | 3645246 C2 | * | 10/1997 |
| DE | 10 2004 026 117 B3 | | 7/2005 |
| EP | 271729 A2 | * | 6/1988 |
| EP | 508178 A1 | * | 10/1992 |
| EP | 1156261 A2 | * | 11/2001 |
| GB | 2106216 A | * | 4/1983 |
| WO | WO 9429636 A1 | * | 12/1994 |
| WO | WO 2005/124220 A1 | | 12/2005 |

OTHER PUBLICATIONS

French Search Report dated Dec. 20, 2010.

* cited by examiner

*Primary Examiner* — Kimberly Wood
(74) *Attorney, Agent, or Firm* — Walter Ottesen

(57) ABSTRACT

A carrying arrangement having a carrier arm adjustable in elevation is improved so that a load carried thereby can be easily exchanged. A gas-pressure spring (6) incorporates a latching device in such a manner that the gas-pressure spring self latches when a predetermined blocking position (P2) is reached and the self-latching device is disabled in response to an application of pressure to the carrier arm so as to move the carrier arm beyond the blocking position (P2).

5 Claims, 6 Drawing Sheets

US 8,177,181 B2

CARRYING ARRANGEMENT

CROSS REFERENCE TO RELATED APPLICATION

This application claims priority of German patent application no. 10 2006 014 217.9, filed Mar. 28, 2006, the entire contents of which is incorporated herein by reference.

FIELD OF THE INVENTION

The invention relates to a carrying arrangement for supporting a load. A carrier arm is mounted between two head pieces and includes first and second legs interconnected to define an articulated parallelogram with the head pieces to permit a pivot movement of the carrier arm in elevation causing the second head piece to change elevation relative to the first head piece. A load can be mounted on the second head piece. The carrying arrangement includes a counter-force device and a latching device for blocking the articulated parallelogram.

BACKGROUND OF THE INVENTION

A carrying arrangement of the above kind is disclosed in German patent publication DE 195 26 632 A1. Two carrier arm legs are arranged between two end head pieces in the form of an articulated parallelogram. The carrier arm legs are pivotably connected to the head pieces. A counter-force device is provided to compensate for the mass of an apparatus carried by the carrying arrangement. The counter-force device ensures that the elevation of the apparatus can be freely adjusted with the articulated parallelogram. The carrier arm can be blocked in a predetermined position with a fixing device in order to disable the action of the counter-force device.

Carrier arms of this kind are, for example, utilized in medical treatment rooms for accommodating monitoring apparatus. The monitoring apparatus can be positioned in a simple manner at eye elevation of the user via the freely pivotable articulated parallelogram.

With the known carrying arrangement, it is a disadvantage that the articulated parallelogram moves rapidly upwardly when the apparatus being carried is removed from the head piece. One could fix the carrying arrangement in a predetermined position with the fixing device; however, as a rule, a work tool or an additional latching lever is required. For the practical manipulation, this is inconvenient because monitoring apparatus must be rapidly exchanged in the area of medicine when required.

SUMMARY OF THE INVENTION

It is an object of the invention to improve the carrying arrangement of the kind described above so that an exchange of the apparatus carried by the carrying arrangement can be performed in a simple manner.

The carrying arrangement of the invention is for supporting a load. The carrying arrangement includes: a first head piece for mounting the carrying arrangement at a predetermined location; a second head piece adapted to receive the load thereon; a carrier arm mounted between the first and second head pieces; the carrier arm including first and second legs interconnected via the first and second head pieces to define an articulated parallelogram to permit a pivot movement of the carrier arm in elevation along a pivot path between a rest position and an end position causing the second head piece to change in elevation relative to the first head piece; a gas-pressure spring for applying a counter force to the carrier arm in a direction toward the rest position; the gas-pressure spring including a latching device for self-latching the gas-pressure spring when the carrier arm reaches a predetermined blocking position (P2) along the path; and, the gas-pressure spring further including means for disabling the self-latching device and releasing the gas-pressure spring in response to a force applied to the carrier arm so as to move the carrier arm beyond the blocking position (P2).

The advantage of the invention is essentially that the counter-force device and the fixing device are assembled as a unit in a gas-pressure spring. For this purpose, the gas-pressure spring includes a pressure mechanism which is so configured that a displaceable lift rod of the gas-pressure spring self latches when reaching a predetermined blocking position and stays in this position. The self latching of the pressure mechanism is disabled via a pressure actuation of the lift rod beyond the blocking position and the carrier arm can be freely adjusted within the work range. Pressure mechanisms of this kind are used, for example, in ball point pens in order to bring the writing cartridge into a work position and thereafter to position the writing cartridge again within the ball point pen sleeve via pressure on a button.

As a practical matter, the blocking position is so dimensioned that it is disposed in the pushed-in position of the gas-pressure spring.

The gas-pressure spring is mounted in a known manner between the legs of the articulated parallelogram or between one of the head pieces and a leg.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
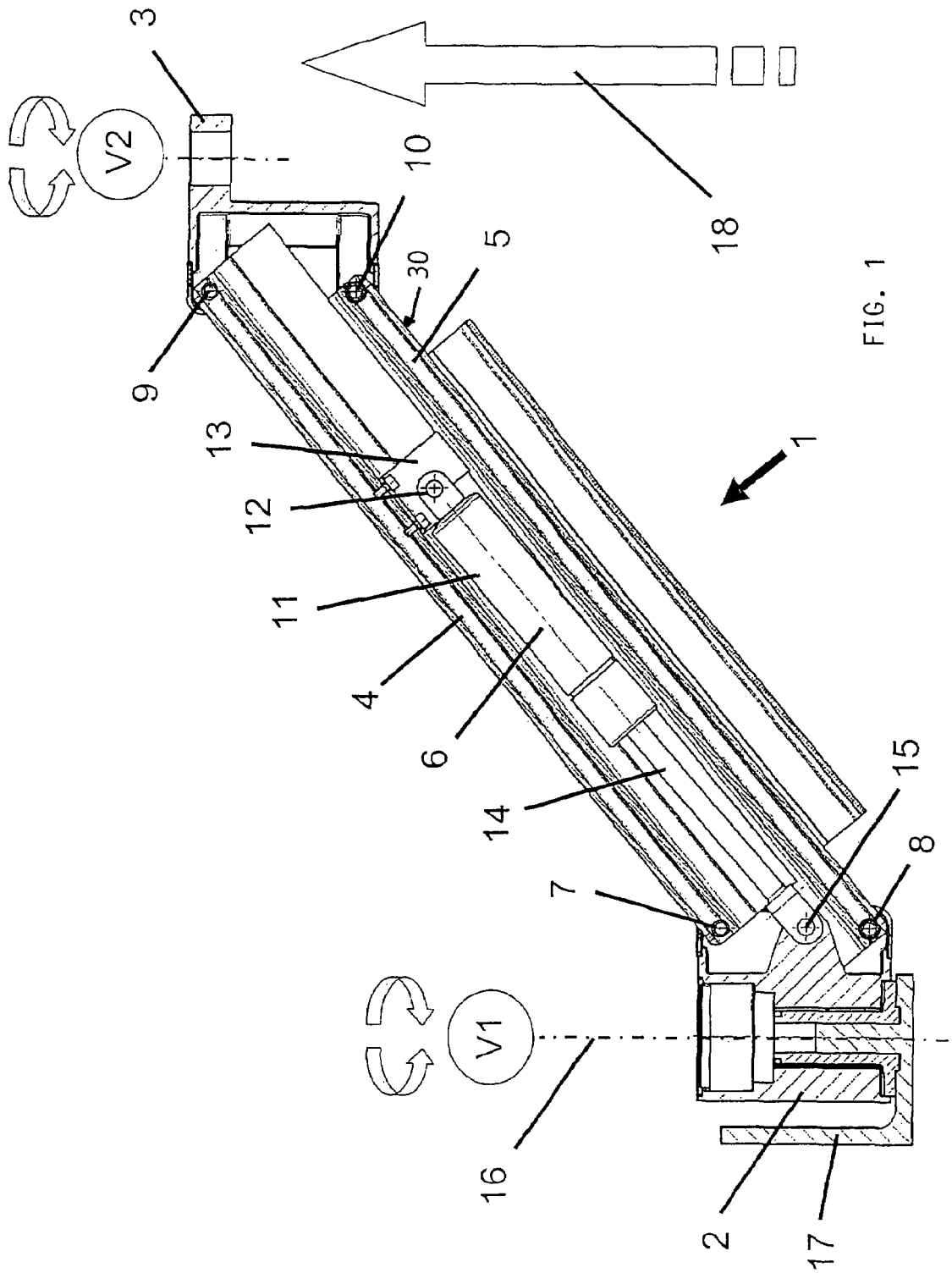
FIG. 1 shows a carrying arrangement of an embodiment of the invention in longitudinal section with the carrier arm in the rest position.

FIG. 1 schematically shows a carrying arrangement 1 in longitudinal section with the carrying arrangement including a first head piece 2, a second head piece 3, a first leg 4, a second leg 5 and a gas-pressure spring 6. The legs (4, 5) are in the form of an articulated parallelogram connected with the head pieces (2, 3) via pivot pin joints (7, 8, 9, 10). A piston sleeve 11 of the gas-pressure spring 6 is attached via a pivot pin joint 12 and an attachment angle 13 to the first leg 4. A lift rod 14 of the gas-pressure spring 6 is mounted on the first head piece 2 via a pivot pin joint 15. The first head piece 2 is rotatable about a vertical axis 16 and is accommodated on a wall mount or equipment mount 17. An object (not shown) to be supported by the carrying arrangement is mounted on the second head piece 3.

FIG. 1 shows a rest position which the carrying arrangement 1 assumes when the load (not shown) carried thereby is removed. The carrier arm 30 moves up to the rest position in the direction of arrow 18 under the action of the counter force of the gas-pressure spring 6.

Figure 2:
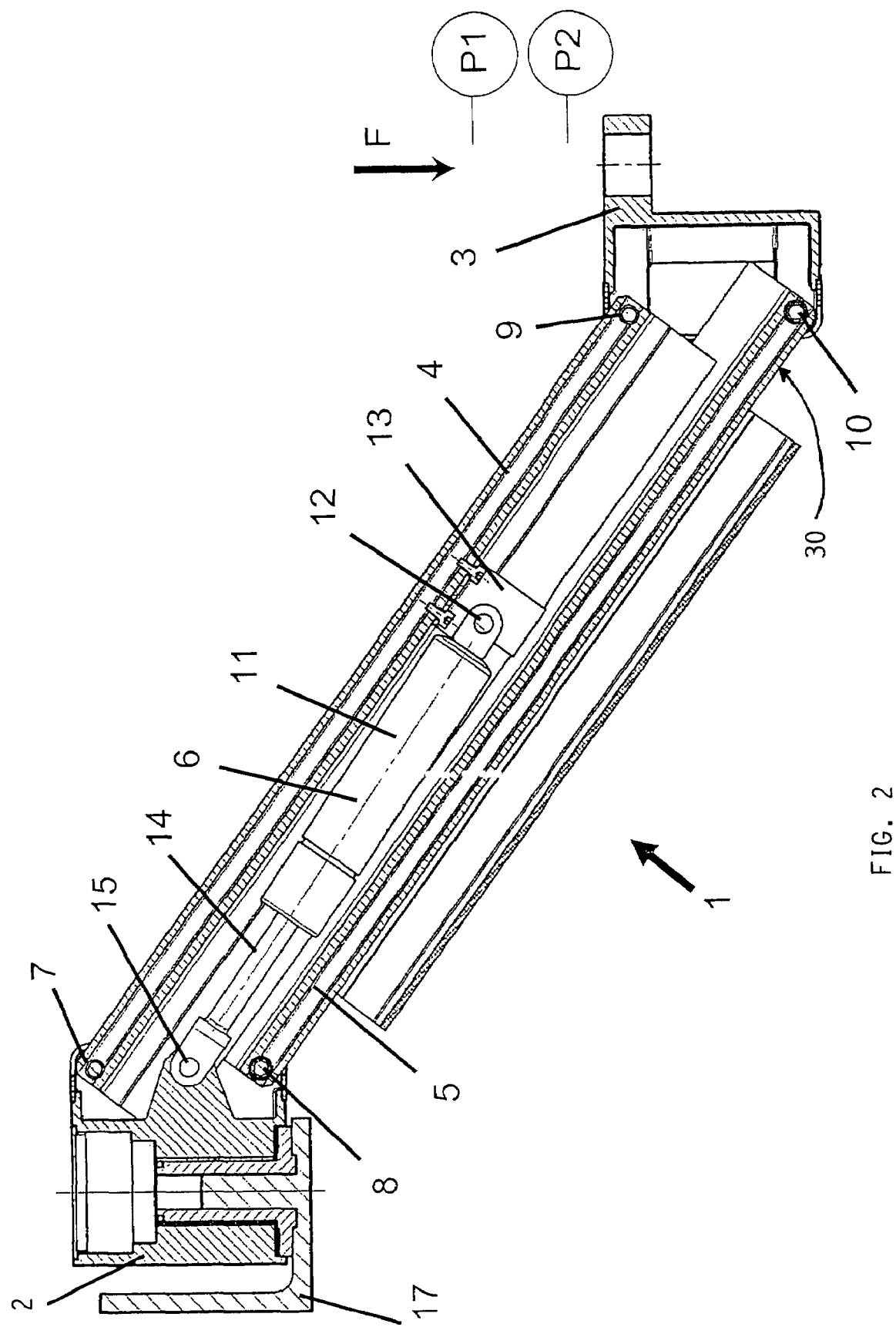
FIG. 2 shows the carrying arrangement of FIG. 1 in the blocked position.
Figure 3:
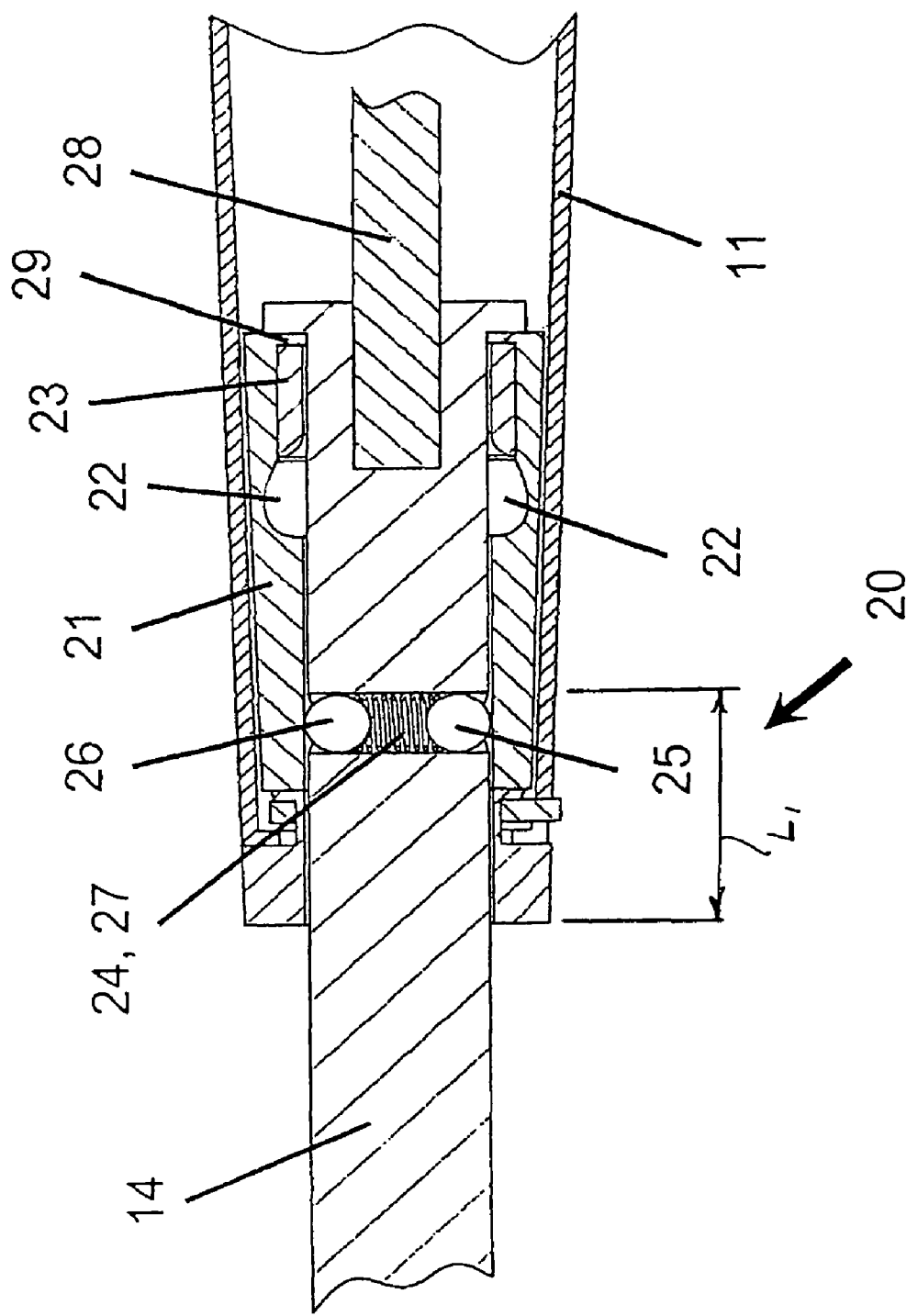
FIGS. 3 to 6 are schematics which show the operation of the latching device arranged within the gas-pressure spring.

FIG. 2 shows the carrying arrangement 1 with the carrier arm 30 in a blocked position P2. When the carrier arm 30 is moved downwardly from the rest position under the action of force F applied to the second head piece 3, the second head piece 3 first reaches a threshold position P1 whereat a latching device (not shown in FIG. 2) of the gas-pressure spring 6 is activated. When the second head piece 3 reaches the blocking position P2 and is then released, the carrier arm 30 remains in the position P2.

When the second head piece 3 is deflected downwardly beyond the blocking position P2 by a pressure actuation, the self latching is disabled and the second head piece 3 can be pivoted in the work region. In this way, it is possible to first latch the carrier arm 30 in the blocking position P2 and then remove a load (not shown) from the second head piece 3. The carrier arm 30 remains then in the blocking position P2. After a new load is thereafter placed on the second head piece 3, the blocking position P2 is disabled and the new load can be freely pivoted in the work region of the carrier arm 30.

In FIGS. 3 to 6, the operation of the latching device 20 within the gas-pressure spring 6 is shown having the piston sleeve 11 and the lift rod 14. The lift rod 14 is guided in a sleeve 21 having a circularly-shaped cutout 22 and has a transverse bore 24 which functions to receive two balls (25, 26) having a helical spring 27 disposed therebetween. An inner lift rod 28 extends from the lift rod 14 and extends within the piston sleeve 11. A tube piece 23 is disposed at the lower end of the sleeve 21 and is displaceable thereon. The tube piece 23 lies against a projecting edge 29 of the sleeve 21.

Figure 4:
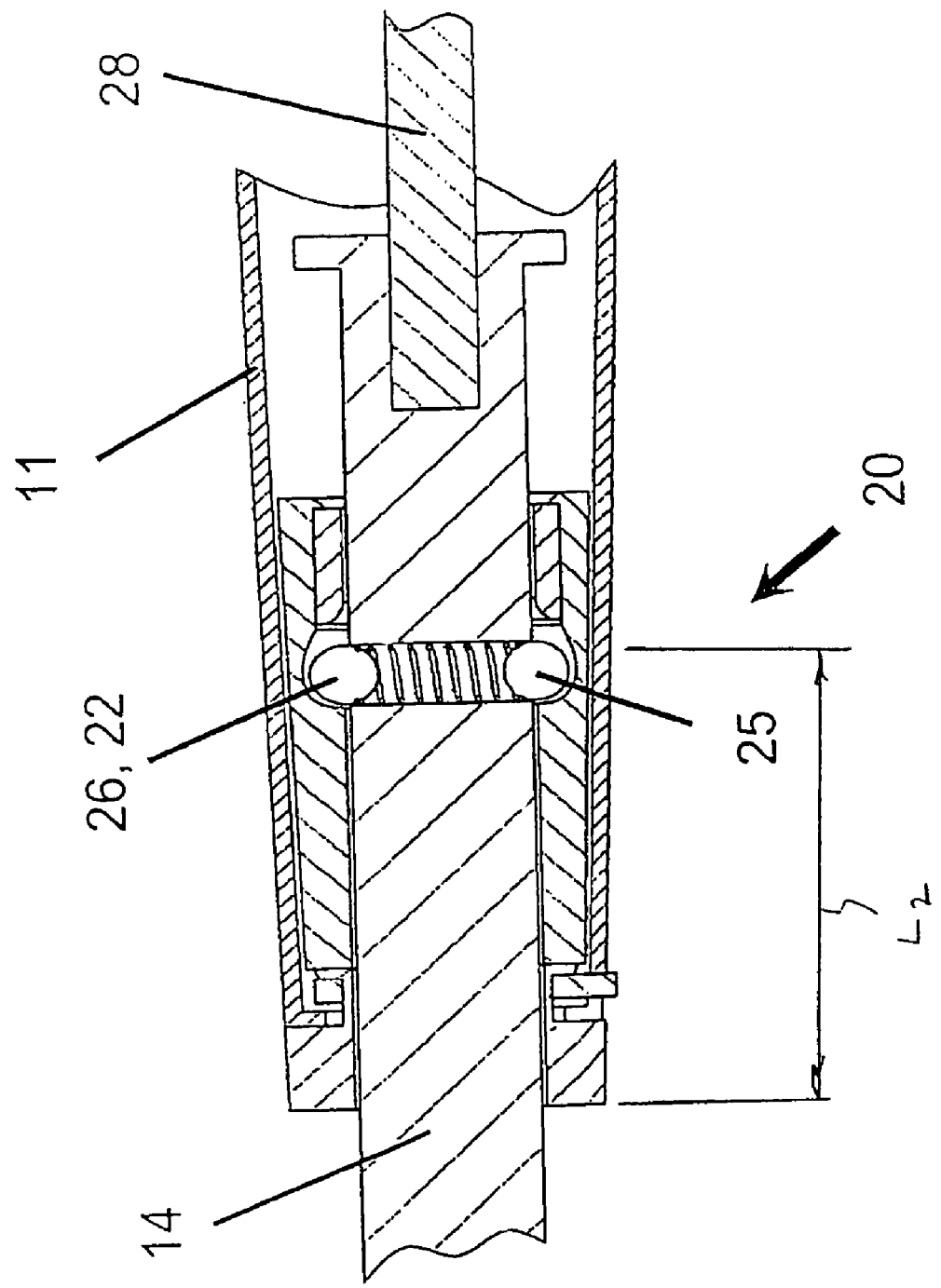

FIG. 4 shows the latching device 20 in the blocking position P2 wherein the balls (25, 26) are latched in the cutout 22.

Figure 5:
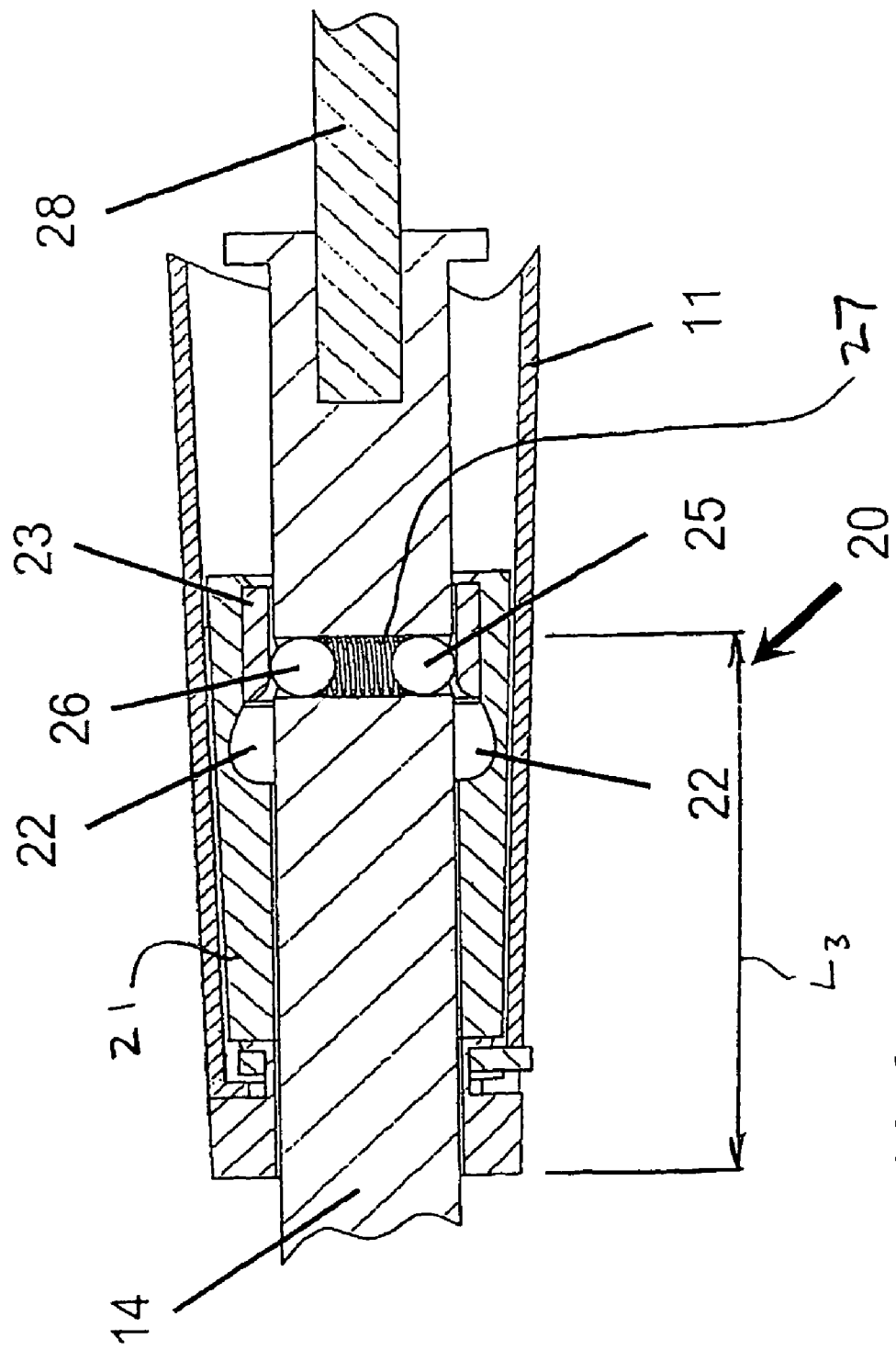

As shown in FIG. 5, when the lift rod 14 is pushed further into the piston sleeve 11, the balls (25, 26) slide into the interior of the tube piece 23 and the spring 27 tightly presses the balls (25, 26) against the inner wall surface of the tube piece 23.

Figure 6:
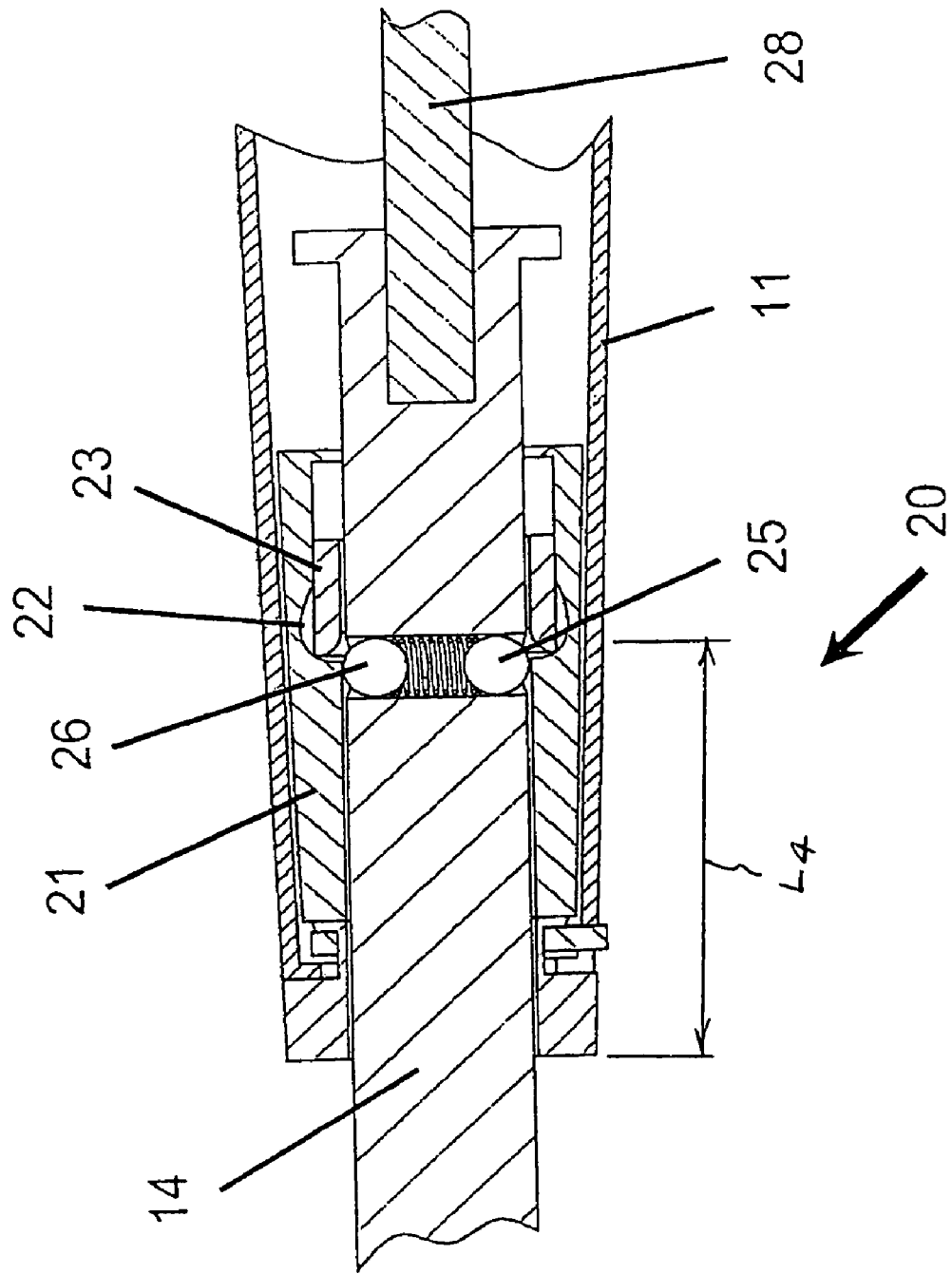

When the lift rod 14 is pulled out of the sleeve 21, the balls (25, 26) together with the tube piece 23 are displaced to the left as shown in FIG. 6. The force applied against the inner wall surface of tube piece 23 is sufficient so that tube piece 23 can be displaced to the left because of the friction forces between the balls (25, 26) and the inner wall surface of the tube piece 23. The tube piece 23 is moved to the left until the balls (25, 26) lie against the inner wall of the sleeve 21.

It is understood that the foregoing description is that of the preferred embodiments of the invention and that various changes and modifications may be made thereto without departing from the spirit and scope of the invention as defined in the appended claims.

What is claimed is:

1. A carrying arrangement for supporting a load, the carrying arrangement comprising:
    a first head piece for mounting said carrying arrangement at a predetermined location;
    a second head piece adapted to receive said load thereon;
    a carrier arm mounted between said first and second head pieces;
    said carrier arm including first and second legs interconnected via said first and second head pieces to define an articulated parallelogram to permit a pivot movement of said carrier arm in elevation along a pivot path between a rest position and a threshold position (P1) causing said second head piece to change in elevation relative to said first head piece;
    a gas-pressure spring for applying a counter force to said carrier arm in a direction toward said rest position;
    said gas-pressure spring including a self-latching device for self-latching said gas-pressure spring when said carrier arm is pushed downwardly with an applied force beyond said threshold position (P1) and further away from said rest position to a predetermined blocking position (P2) wherein said carrier arm is blocked and remains in said blocking position (P2) when said applied force is released; and,
    said gas-pressure spring further including a disengaging and disabling device for disengaging said self-latching device in response to a downward force applied to said carrier arm moving said carrier arm in a first direction beyond said blocking position (P2) and for disabling said self-latching device when said carrier arm is allowed to return past said blocking position (P2) in a second direction opposite to said first direction upon removal of said downward force.

2. The carrying arrangement of claim 1, wherein said gas-pressure spring has a pushed-in position; and, said blocking position (P2) corresponds to said pushed-in position of said gas-pressure spring.

3. The carrying arrangement of claim 1, wherein said gas-pressure spring is mounted between one of said head pieces and one of said legs.

4. The carrying arrangement of claim 1, wherein said self-latching device and said disengaging and disabling device are contained entirely within said articulated parallelogram.

5. A carrying arrangement for supporting a load, the carrying arrangement comprising:
    a first head piece for mounting said carrying arrangement at a predetermined location;
    a second head piece adapted to receive said load thereon;
    a carrier arm mounted between said first and second head pieces;
    said carrier arm including first and second legs interconnected via said first and second head pieces to define an articulated parallelogram to permit a pivot movement of said carrier arm in elevation along a pivot path between a rest position and a threshold position (P1) causing said second head piece to change in elevation relative to said first head piece;
    a gas-pressure spring for applying a counter force to said carrier arm in a direction toward said rest position;
    said gas-pressure spring including a self-latching device for self-latching said gas-pressure spring when said carrier arm is pushed downwardly with an applied force beyond said threshold position (P1) and further away from said rest position to a predetermined blocking position (P2) wherein said carrier arm is blocked and remains in said blocking position (P2) when said applied force is released;
    said gas-pressure spring further including a disengaging and disabling device for disengaging said self-latching device in response to a downward force applied to said carrier arm moving said carrier arm in a first direction beyond said blocking position (P2) and for disabling said self-latching device when said carrier arm is allowed to return past said blocking position (P2) in a second direction opposite to said first direction upon removal of said downward force;
    said gas-pressure spring including a piston sleeve pivotally connected to one of said legs; and, a lift rod pivotally connected to one of said head pieces;
    said latching device including a latching sleeve disposed within said piston sleeve for guiding said lift rod therein;
    said latching sleeve having a cutout and said latching device further including a transverse bore in said lift rod accommodating a ball and a spring for resiliently biasing said ball against said latching sleeve for engaging said cutout when said carrier arm arrives at said blocking position (P2) thereby blocking said carrier arm;

said disengaging and disabling device including a tube piece disposed within said latching sleeve adjacent said cutout for receiving said ball in pressure contact therewith when said lift rod is moved farther into said piston sleeve in correspondence to the movement of said carrier arm beyond said blocking position (P2); and, said pressure contact being sufficient to enable said tube piece to move along said latching sleeve with said lift rod to said cutout to prevent said ball from entering said cutout thereby disabling said self-latching device as said carrier arm moves past said blocking position (P2) in a direction toward said rest position.

\* \* \* \* \*